United States Patent
McDowell

(10) Patent No.: US 9,522,320 B1
(45) Date of Patent: Dec. 20, 2016

(54) MOUNTING BRACKET AND BRAKE ASSEMBLY

(71) Applicant: Patrick McDowell, Fullerton, CA (US)

(72) Inventor: Patrick McDowell, Fullerton, CA (US)

(*) Notice: Subject to any disclaimer, the term of this patent is extended or adjusted under 35 U.S.C. 154(b) by 0 days.

(21) Appl. No.: 14/961,664

(22) Filed: Dec. 7, 2015

Related U.S. Application Data

(62) Division of application No. 14/308,481, filed on Jun. 18, 2014, now abandoned.

(51) Int. Cl.
| | | |
|---|---|---|
| A63C 17/14 | (2006.01) | |
| F16M 13/02 | (2006.01) | |
| F16B 2/06 | (2006.01) | |
| F16B 9/02 | (2006.01) | |
| F16M 11/04 | (2006.01) | |

(52) U.S. Cl.
CPC ............ *A63C 17/1418* (2013.01); *F16B 2/065* (2013.01); *F16B 9/023* (2013.01); *F16M 11/04* (2013.01); *F16M 13/02* (2013.01); *Y10T 24/44017* (2015.01)

(58) Field of Classification Search
CPC .......... A63C 17/1418; B60T 1/02; B60T 1/04; B62B 5/0433; B60B 33/02; B60B 33/021; B60B 33/023; B60B 33/0078; B60B 33/0081
See application file for complete search history.

(56) References Cited

U.S. PATENT DOCUMENTS

| | | | | | |
|---|---|---|---|---|---|
| 1,785,421 | A | * | 12/1930 | Nielsen | B60B 33/021 16/35 R |
| 3,493,085 | A | * | 2/1970 | Libhart | B60B 33/0078 16/35 R |
| 4,349,937 | A | * | 9/1982 | Fontana | B60B 33/0078 16/35 R |
| 5,236,066 | A | * | 8/1993 | O'Neal | B60B 33/0078 16/35 R |
| 5,497,856 | A | * | 3/1996 | Block | B60B 33/0081 188/1.12 |
| 2011/0278111 | A1 | * | 11/2011 | Junk | F16D 49/00 188/74 |

* cited by examiner

Primary Examiner — Vishal Sahni
(74) Attorney, Agent, or Firm — Plager Schack LLP

(57) ABSTRACT

The embodiments disclosed herein relate to a brake assembly for decelerating motion of a vehicle having a deck and a plurality of wheels. The brake assembly comprises a generally U-shaped member configured so that when attached to the vehicle the first portion extends transversely across at least a portion of the deck to form a foot bar. A brake flap attached to the second portion of the U-shaped members such that when the brake assembly is attached to the vehicle the brake flap is positioned proximal to at least one wheel of the vehicle. A mechanical fastener is configured to secure the brake assembly to the vehicle in a manner that permits rotatable movement of the foot bar and the brake flap with a spring positioned on the brake assembly configured to bias the brake flap away from the wheel to minimize interference with the wheel until the user of the vehicle depresses the foot bar so as to engage the wheel for deceleration.

2 Claims, 5 Drawing Sheets

MOUNTING BRACKET AND BRAKE ASSEMBLY

RELATED APPLICATION

This application claims priority to provisional patent application U.S. Ser. No. 14/308,481 filed on Jun. 18, 2014, the entire contents of which is herein incorporated by reference.

BACKGROUND

The embodiments herein relate generally to a mounting bracket and a brake assembly for a moveable board such as a skateboard or long board.

SUMMARY

The embodiments disclosed herein relate to a mounting bracket configured to be secured to a deck without damaging the deck for the attachment of accessories. The bracket comprises is generally rigid U-shaped outer housing and a flexible L-shaped clip nested within the housing and at least one set mechanical fastener configured to penetrate the U-shaped housing to compress the L-shaped clip against the surface of the deck to secure the bracket to the deck. The bracket is configured to mount accessories selected a group consisting of a camera, a light, a brake assembly for decelerating motion, a seat assembly, and a video recorder.

The brake assembly comprises a generally U-shaped member having a first portion and a second portion wherein the first portion is configured so that when attached to the vehicle the first portion extends transversely across at least a portion of the deck to form a foot bar. A brake flap is attached to the second portion of the brake assembly proximate to at least one wheel of the vehicle. The brake assembly is rotatably mounted to the vehicle to permit rotatable movement of the foot bar and the brake flap with a spring to bias the brake flap away from the proximate wheel to minimize interfere with the wheel until the user of the vehicle depresses the foot bar so as to engage the wheel for deceleration. A plurality of brake assemblies may be mounted to a vehicle deck and connected to each other for simultaneous actuation by a connection member.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1A:
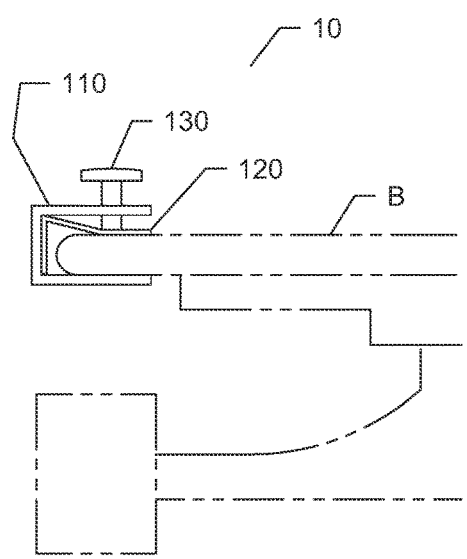
FIG. 1A shows a perspective rear view of one embodiment of the mounting bracket attached to a movable board.
Figure 1B:
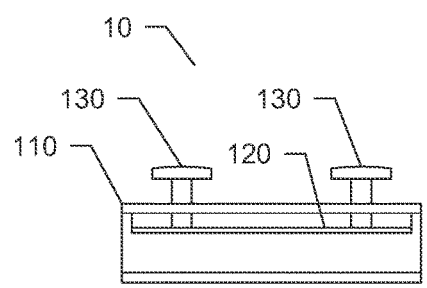
FIG. 1B shows a side view of one embodiment of the mounting bracket.
Figure 3A:
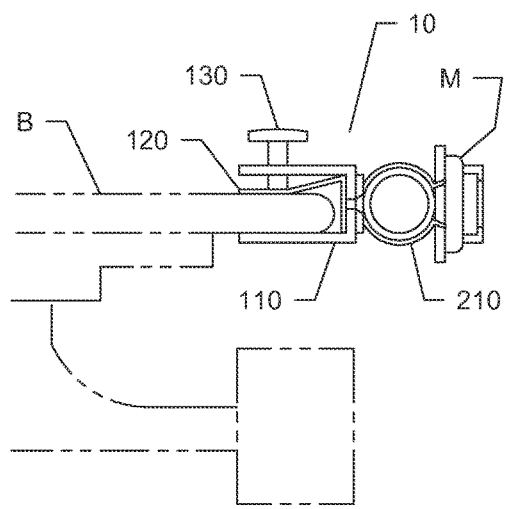
FIG. 3A shows a perspective rear view of one embodiment of the mounting bracket attaching a camera mount to a movable board.
Figure 3B:
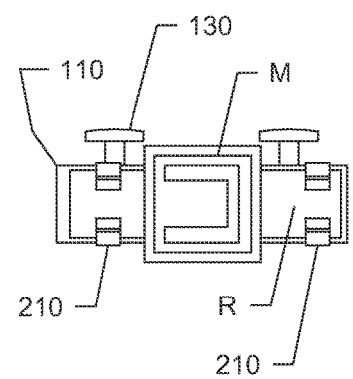
FIG. 3B shows a side view of one embodiment of the mounting bracket attaching a camera mount.
Figure 3C:
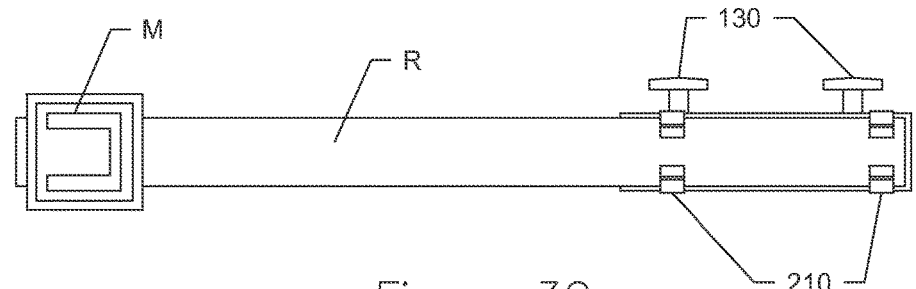
FIG. 3C shows a side view of one embodiment of the mounting bracket attaching an extended camera mount.
Figures 4A, 4B:
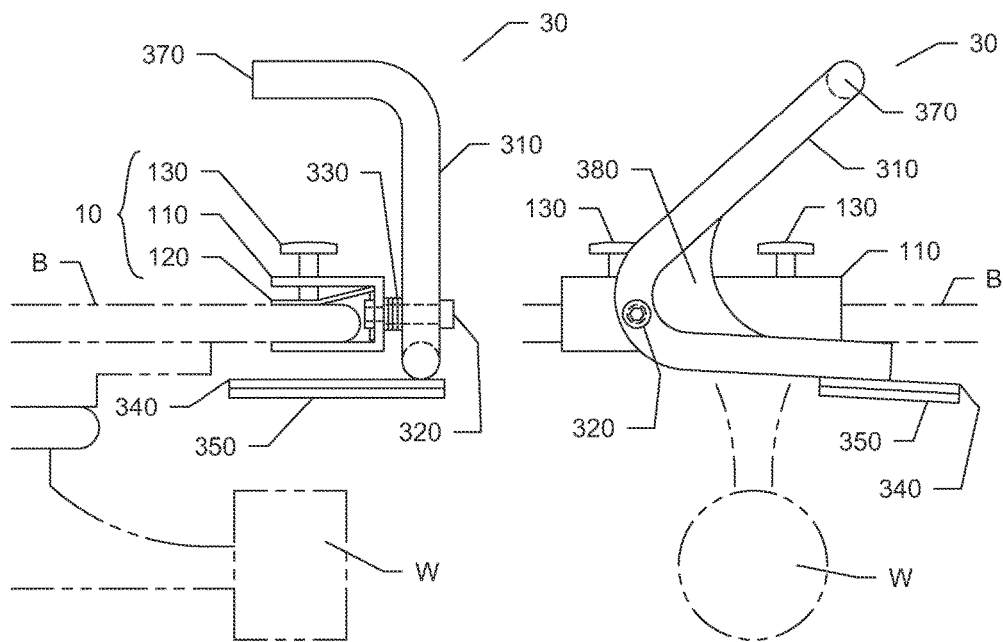
FIG. 4A shows a perspective rear view of one embodiment of the mounting bracket attaching a brake assembly in the disengaged position.
FIG. 4B shows a side view of one embodiment of the mounting bracket attaching a brake assembly in the disengaged position.
Figures 4C, 4D:
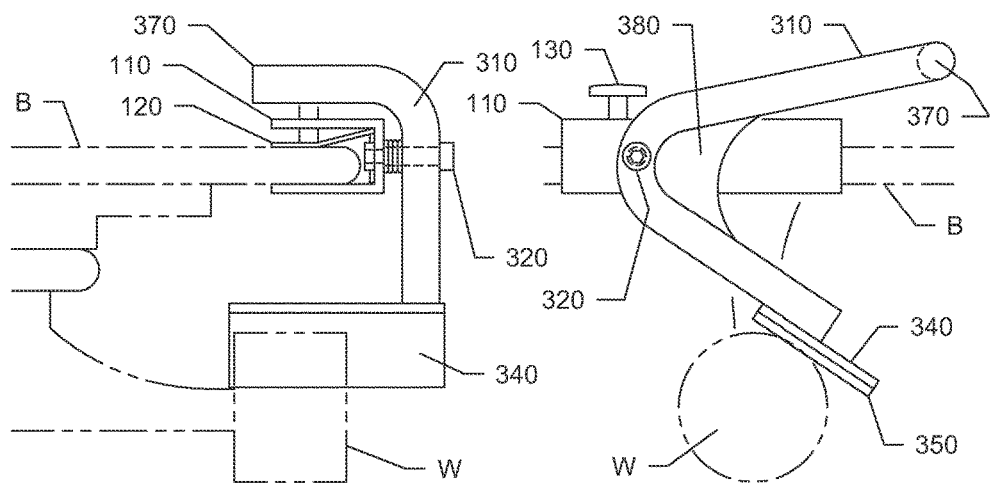
FIG. 4C shows a perspective rear view of one embodiment of the mounting bracket attaching a brake assembly in the actuated position.
FIG. 4D shows a side view of one embodiment of the mounting bracket attaching a brake assembly in the actuated position.

One embodiment of the present mounting bracket 10 to attach accessories to the deck of a moveable board such as a skateboard or long board without damaging the deck is depicted in FIGS. 1A and 1B. The mounting bracket 10 comprises a rigid generally U-shaped housing 110, an L-shaped clip 120, and a set screw 130. The U-shaped housing 110 comprises a top flange, a bottom flange, and a web therebetween. The web of the U-shaped housing 110 is configured to enable the removable attachment of an accessory such as light (FIGS. 2A-B), a camera mount (FIGS. 3A-C), a brake assembly (FIGS. 4, 5, and 6), or a seat assembly to a movable board. The U-shaped housing 110 is fabricated from durable material such as steel, iron or hardened plastic. Nested within housing 110 is a flexible L-shaped clip 120 comprising a top flange connected generally perpendicular to a vertical flange. The vertical flange of the L-shaped clip is generally parallel to the web of the U-shaped housing 110. The L-shaped clip 120 is configured to engage the edge of the skateboard deck with the top flange resting upon the top surface of the of the deck B of the movable board, and the bottom face of the deck B rests on the bottom flange of the U-shaped housing 110. At least one set screw 130 penetrates the U-shaped housing 110 to engage and compress the top flange of the L-shaped clip 120 to secure the bracket 10 to the skateboard deck B without damaging the skateboard deck. As depicted in FIG. 1B, two set screws 130 are utilized as an alternative to secure the mounting bracket to the movable board B. Depending on the length of the bracket the number of set screws may be increased to insure attachment of the mounting bracket to the movable board deck B.

Figure 2A:
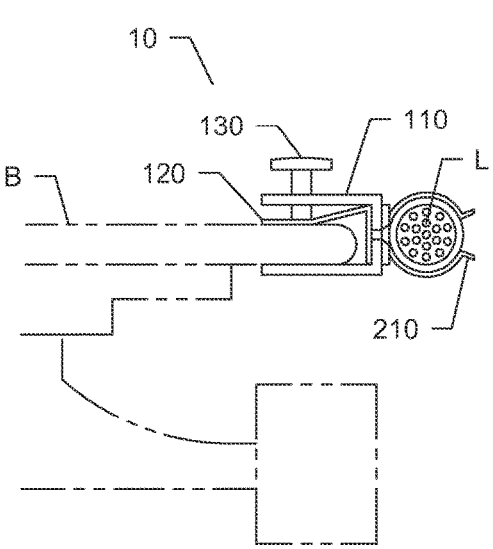
FIG. 2A shows a perspective front view of one embodiment of the mounting bracket attaching a light source to a movable board.
Figure 2B:
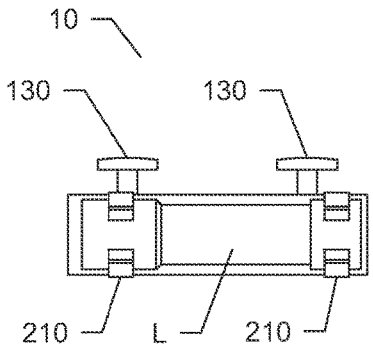
FIG. 2B shows a side view of one embodiment of the mounting bracket with a light source attached thereto.
Figure 5:
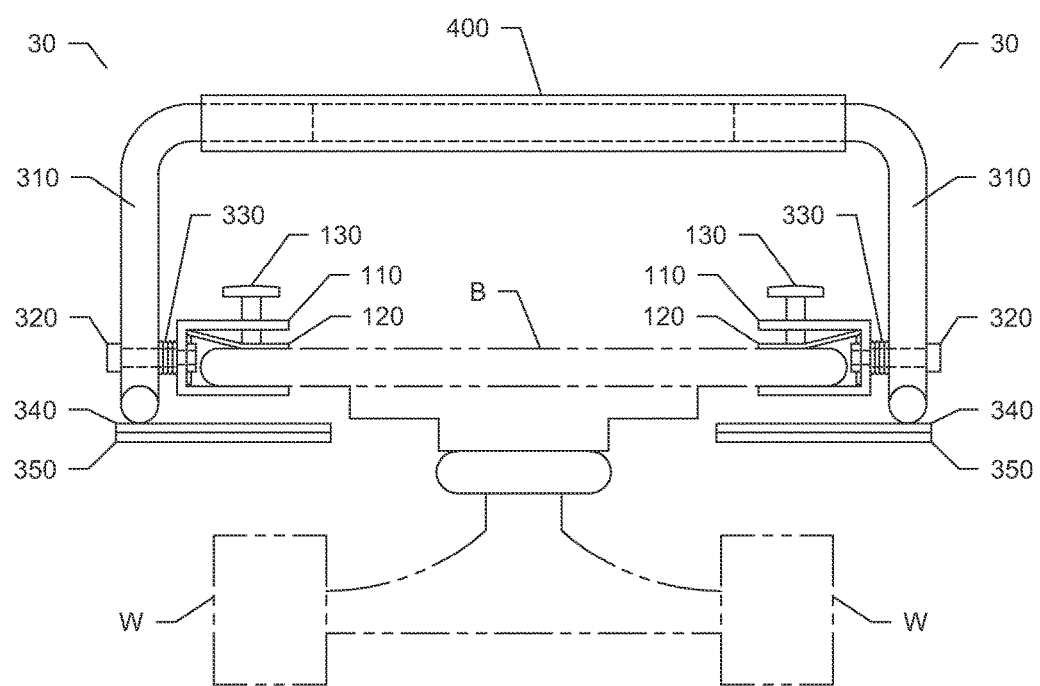
FIG. 5 shows a perspective rear view of the dual brake mechanism conjoined by a foot pedal for single actuation.

The web of the U-shaped housing 110 is configured to attach many different accessories including but not limited a light source L as depicted in FIGS. 2A and 2B, a single wheel brake assembly 30 depicted in FIGS. 4A-D and 6A-B, a dual wheel brake assembly 40 depicted in FIG. 5, or a seat assembly. The web of the mounting bracket 10 is configured to accept different accessories with the inclusion of different arrangements of apertures. For example, a single aperture is required to installation of the brake assembly 30. For the addition of a flash light or a camera mount, at least one spring clip 210 is attached to the web of the mounting bracket 10 to receive and retain a generally cylindrical flashlight L or generally cylindrical camera mount rod R.

FIGS. 4A-D depicts a brake assembly 30 to decelerate a skateboard. The brake assembly 30 comprises a generally U-shaped rod 310 with a first member and a second member. The first member of the rod 310 is transversely bent to form a foot post 370 to enable the user to actuate the brake. The U-shaped rod 310 may be further reinforced with the inclusion of a web 380 between the first and second members of rod 310. A fastener 320 is mounted proximally through the apex of the U-shaped rod 310 to allow the brake assembly to pivot during actuation. At least one rotatable spring 330 surrounds the fastener 320 to bias the brake assembly 30 in a position which does not engage, interfere or otherwise contact the rear wheels W of the moveable board unless actuated by the user.

A brake flap 340 is attached to the second member of the rod 310 to engage the rear wheel W to effectuate deceleration of the movable board. The brake flap 340 may be configured to accept a removable brake pad 350 which may be replaced as needed based upon wear and tear.

Figure 6A:
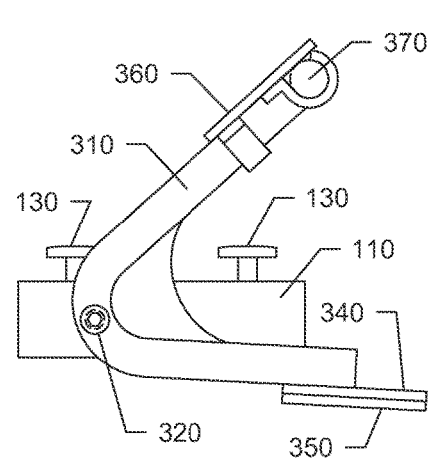
FIG. 6A shows a side view of one embodiment of the mounting bracket assembly attaching a brake assembly in the disengaged position with a foot pedal attached to the brake mechanism.
Figure 6B:
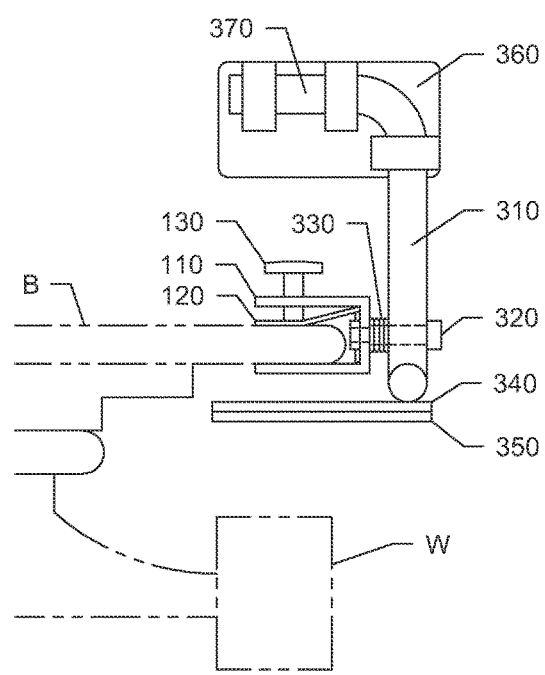
FIG. 6B shows a perspective rear view of one embodiment of the mounting bracket assembly attaching a brake assembly in the disengaged position with a foot pedal attached to the brake mechanism.

The brake assembly 30 is mounted to the deck using a mounting bracket 10. The mounting bracket 10 is configured in conformity with FIGS. 1A-B. The web of the U-shaped housing 110 of the mounting bracket 10 includes a single aperture to rotatably mount the brake assembly 30. Each mounting bracket 10 is aligned with a rear wheel W on the moveable deck to enable the brake assembly 30 to contact the wheel for deceleration. The brake assembly 30 utilized may be further enhanced with the inclusion of a foot pedal 360 attached to the foot post 370 to assist the user with actuating the brake as depicted in FIGS. 6A and 6B. The foot pedal 360 may be coated in a non-slip substance such as rubber for further safety.

To effectively brake a moveable deck without drift requires the installation of a plurality of connected brake assemblies 30 as depicted in FIG. 5. The number of brake assemblies is governed by the number of rear wheels W incorporated on the moveable deck. To insure simultaneous actuation of the plurality of brake assemblies requires a connection of the brake assembly rods 310. As depicted in FIG. 5, the brake assembly rods 310 are connected by connection member 400 which facilitates simultaneous actuation of the plurality of brake assemblies to minimize drift of the skateboard by equally decelerating the rear wheels W.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A dual brake assembly for decelerating motion of a vehicle having a deck and a plurality of wheels, such as a skateboard or longboard where, as a result of the shifting of the weight of a rider to one side, the deck moves closer to the wheels on that one side, and the front and rear wheels on that one side move closer together, the dual brake assembly comprising:

a first brake assembly and a second brake assembly both coupled to the deck, the first brake assembly configured for use with a first wheel in the plurality of wheels, the second brake assembly configured for use with a second wheel in the plurality of wheels, each brake assembly of the first and second brake assemblies comprising:

a generally U-shaped member comprising a first portion and a second portion wherein the first portion is configured so that when attached to the vehicle the first portion extends transversely across at least a portion of the deck to form a foot bar;

a brake flap attached to the second portion such that when the brake assembly is attached to the vehicle the brake flap is positioned proximal to at least one wheel of the vehicle;

a mechanical fastener configured to secure the brake assembly to the vehicle in a manner that permits rotatable movement of the foot bar and the brake flap; and a spring positioned on the brake assembly and configured to bias the brake flap away from the wheel to minimize interference with the wheel until the rider of the vehicle depresses the foot bar so as to engage the wheel for deceleration; and a connector coupled to the first portions of the generally U-shaped members of both the first and second brake assemblies;

wherein the connector permits a simultaneous actuation of the first and second brake assemblies upon a depression of either foot bar of the first brake assembly or second brake assembly, thereby decelerating the vehicle.

2. The dual brake assembly of claim 1, further comprising a brake pad configured to be removably mounted to the brake flap.

* * * * *